Patented Feb. 13, 1934

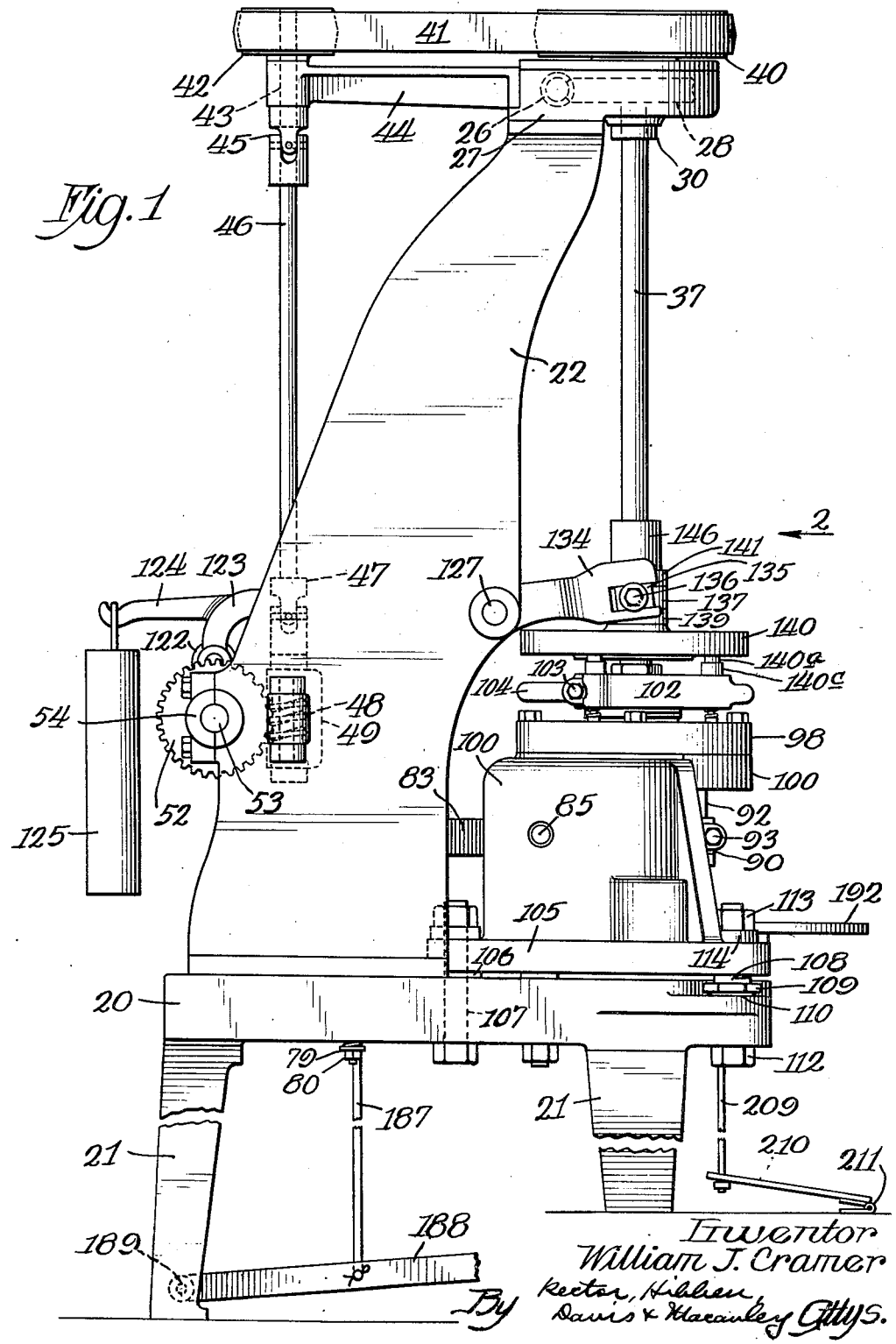

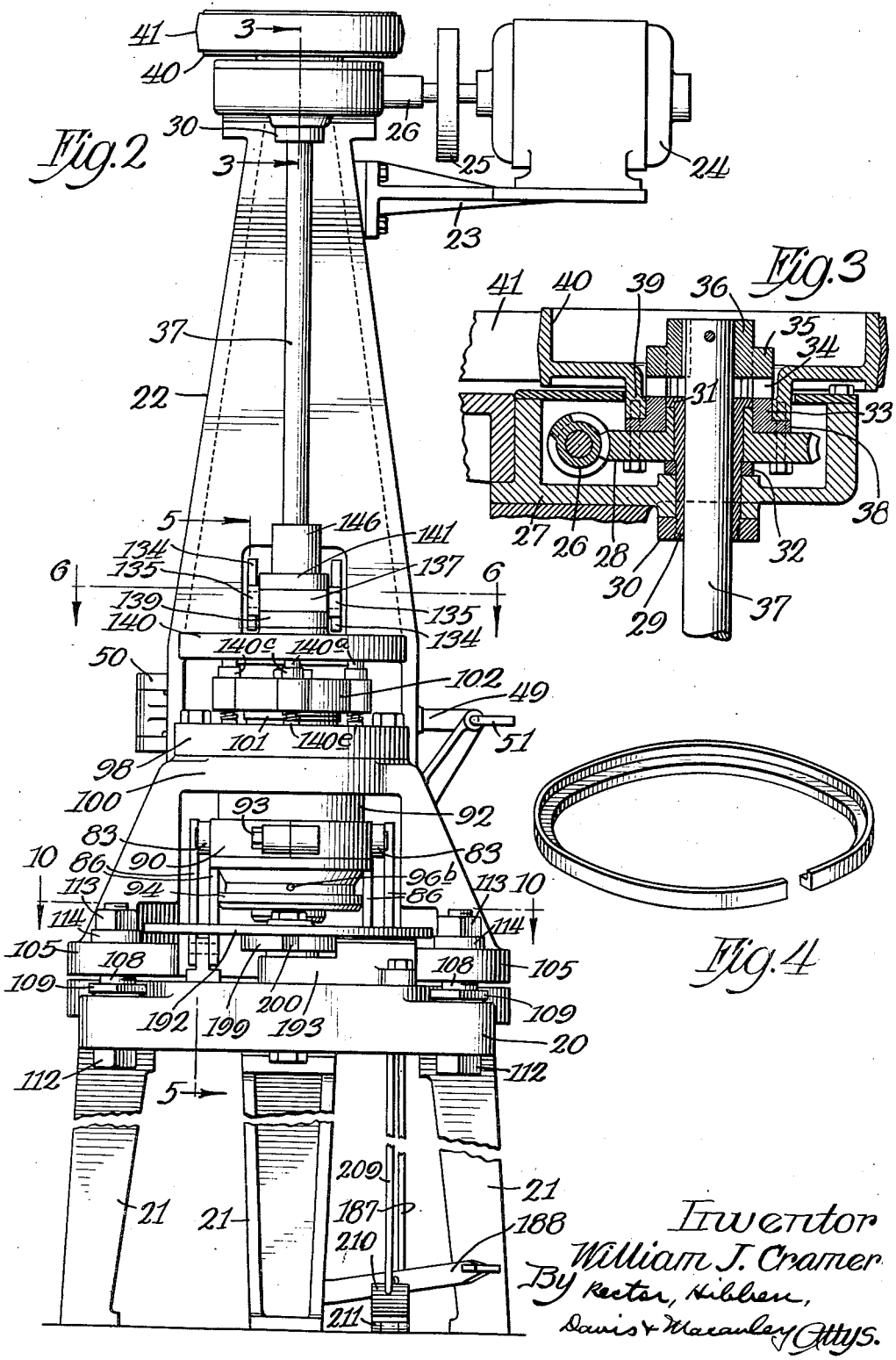

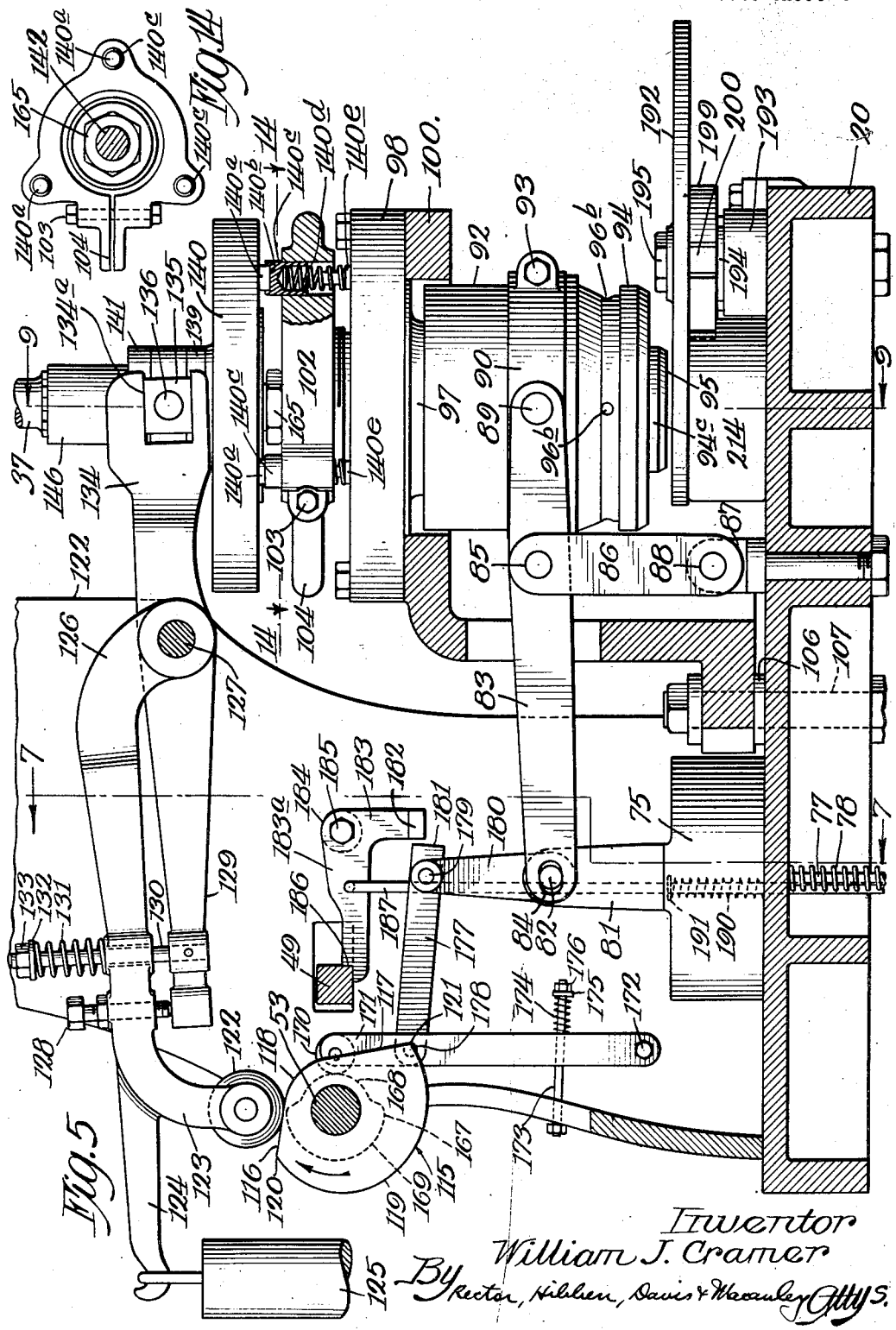

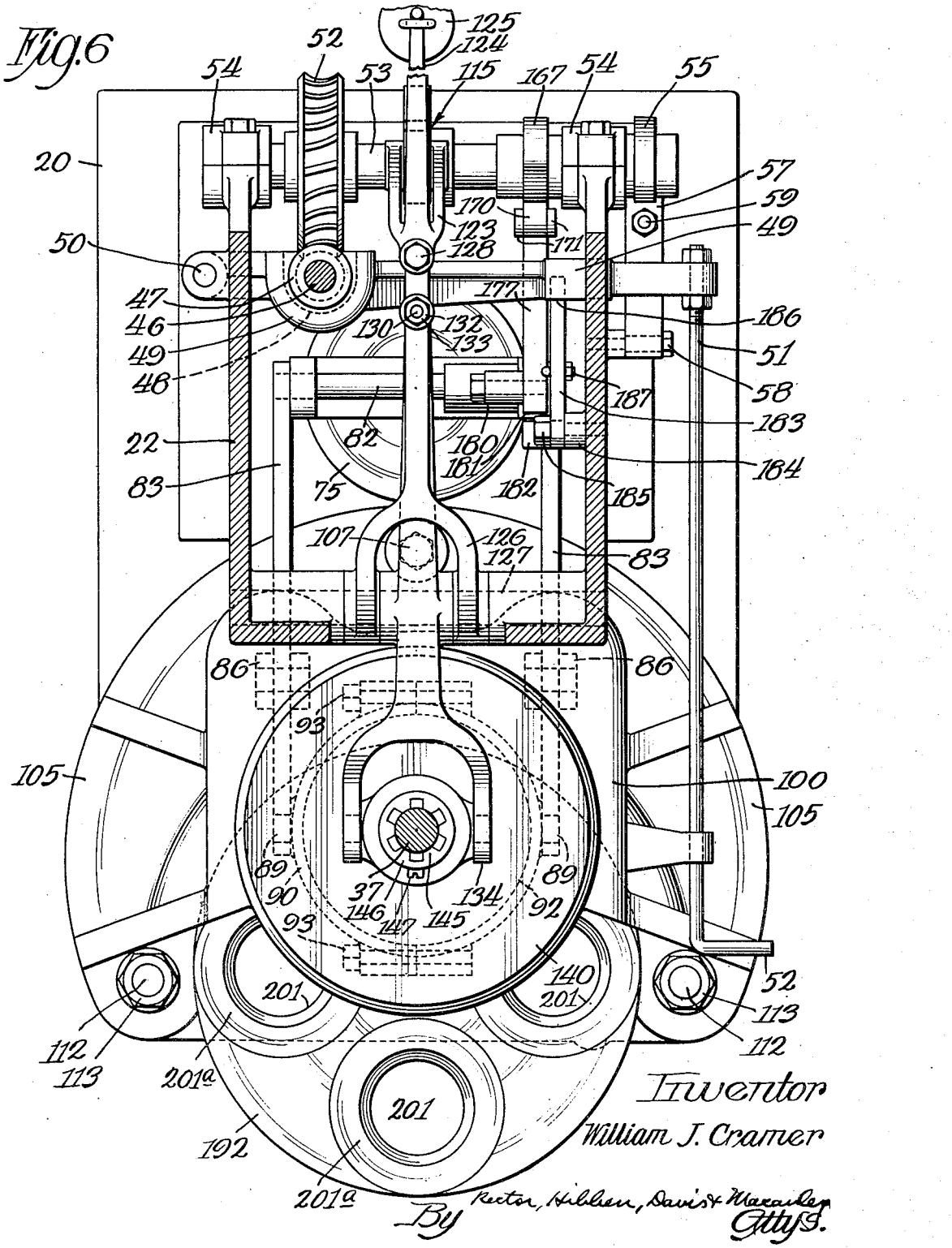

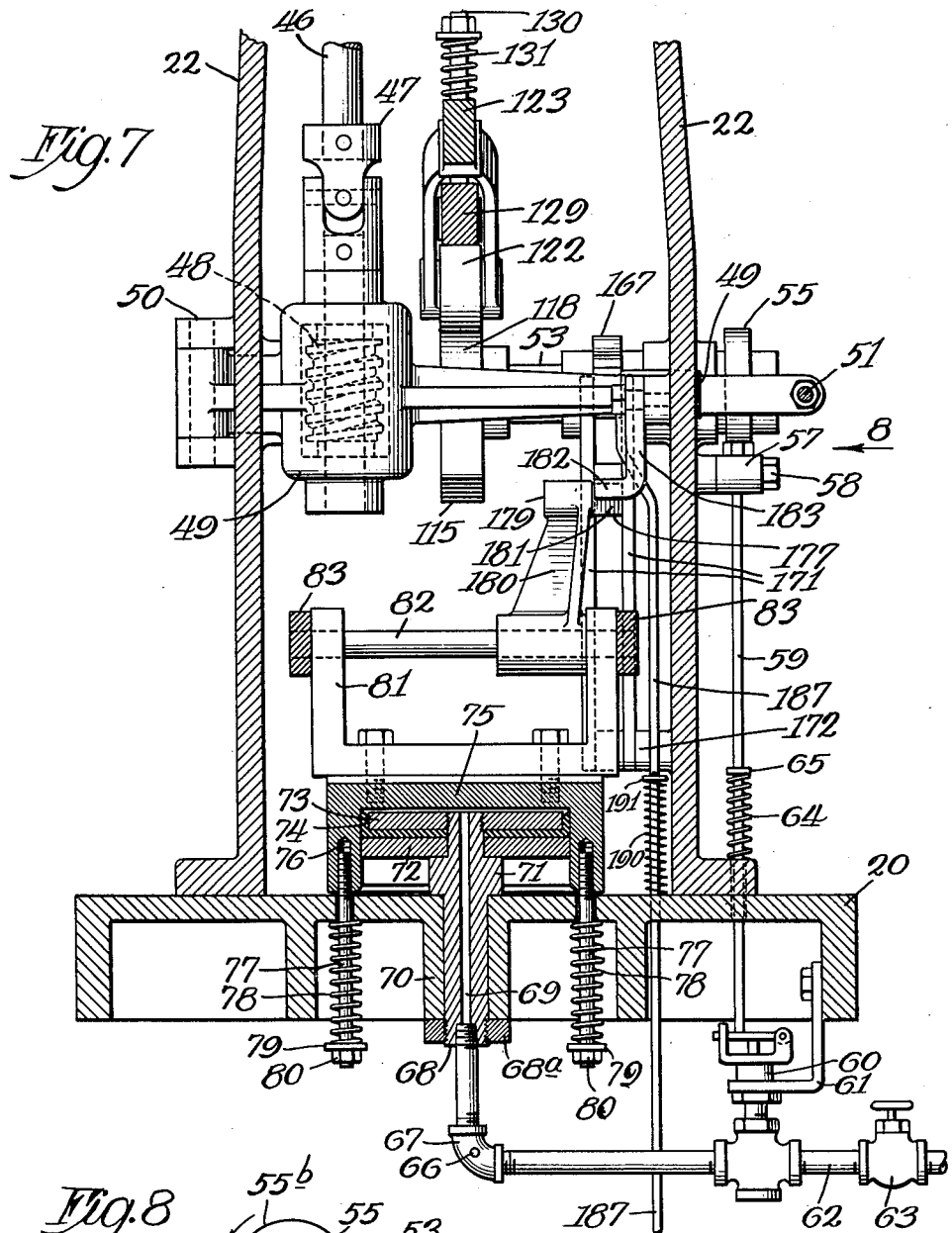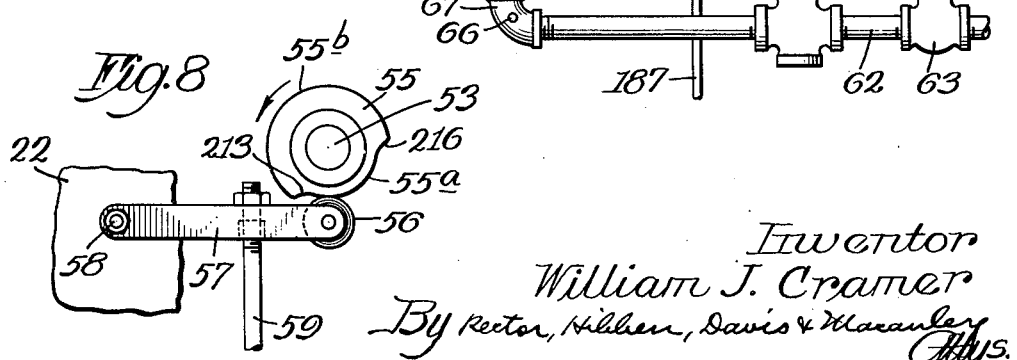

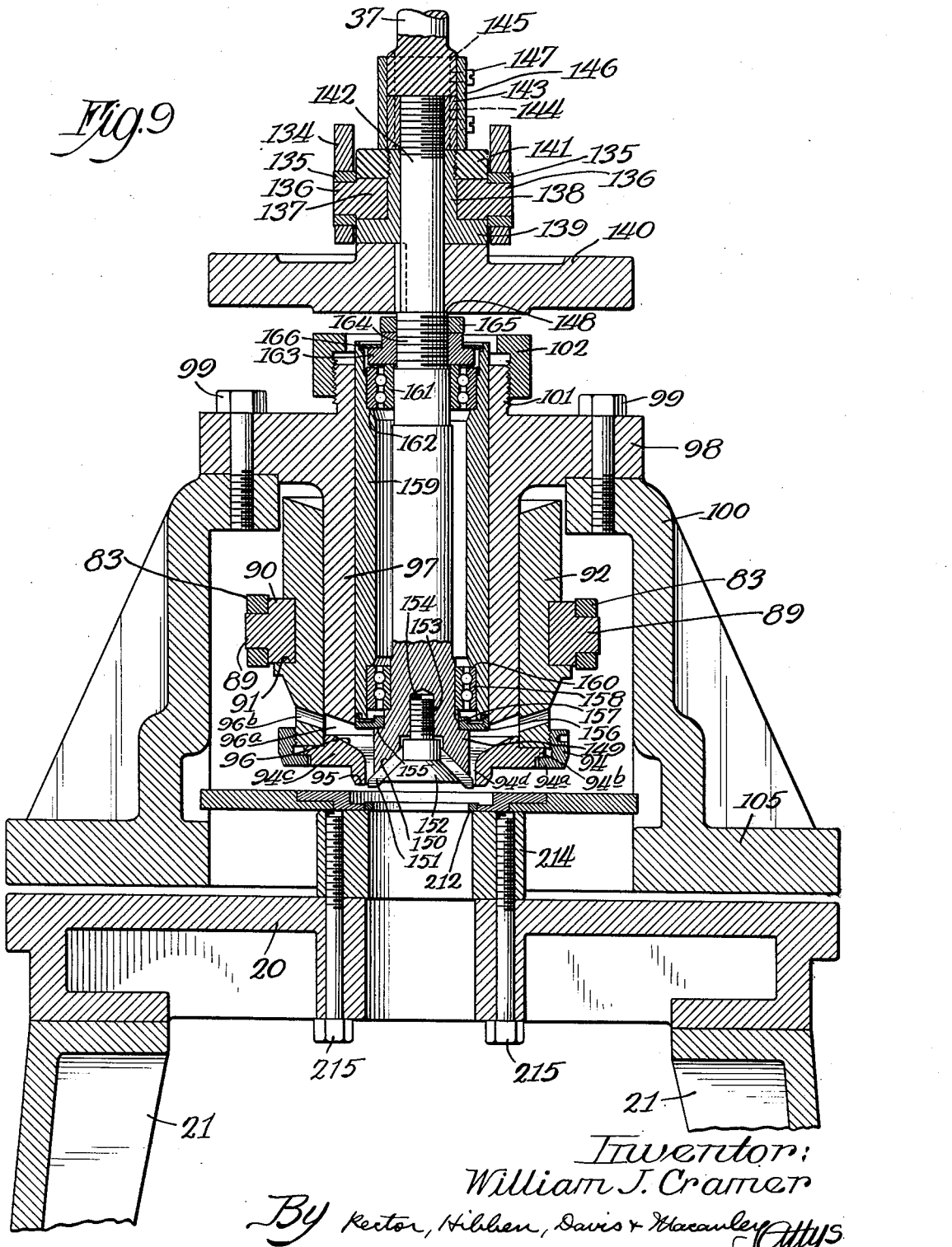

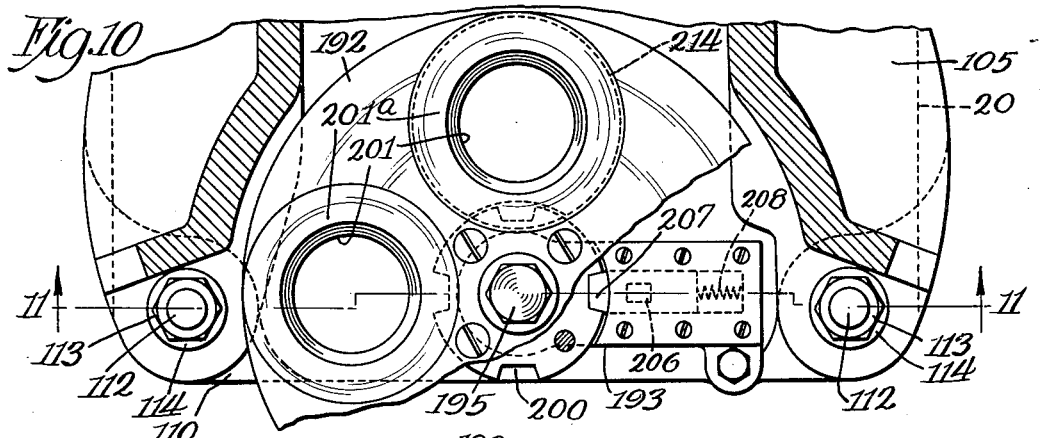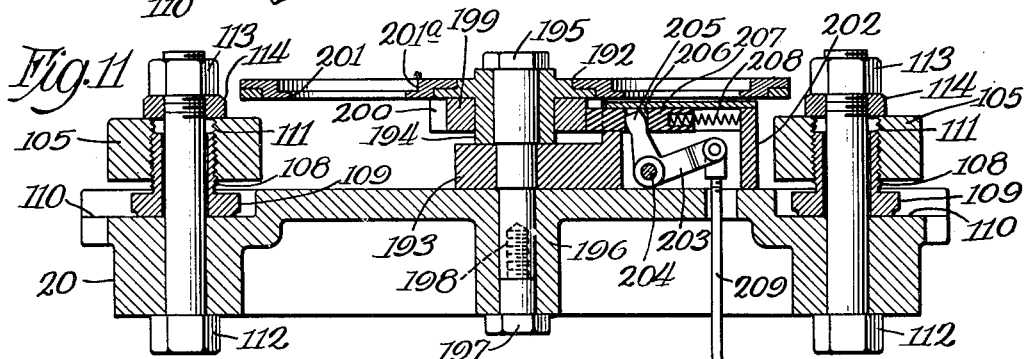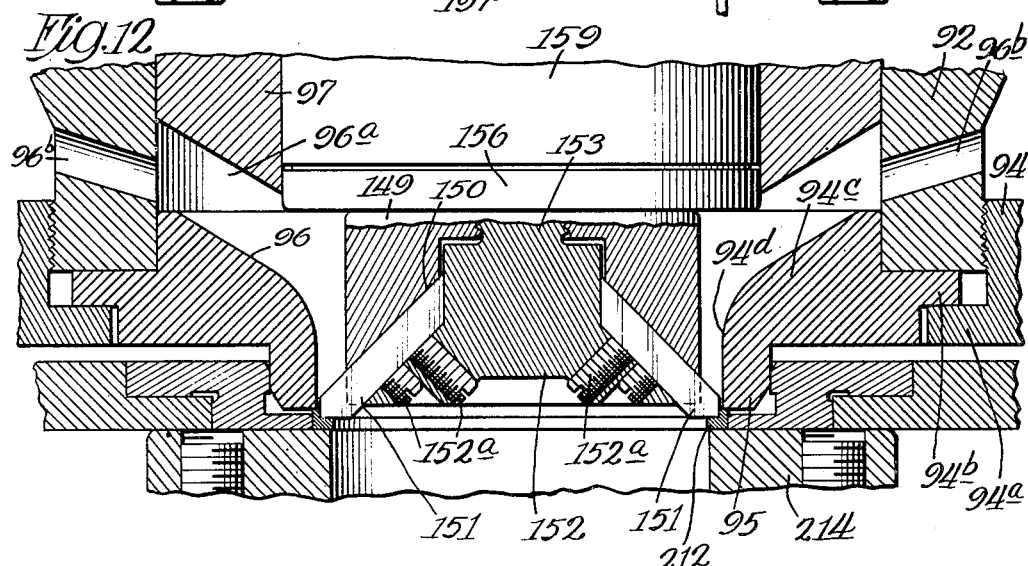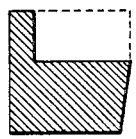

1,946,523

UNITED STATES PATENT OFFICE 1,946,523

BORING MACHINE FOR PISTON RINGS

William J. Cramer, Hagerstown, Ind., assignor to The Perfect Circle Company, Hagerstown, Ind., a corporation of Indiana Application December 22, 1930
Serial No. 503,953

8 Claims. (Cl. 77—4)

My invention relates to a boring machine for piston rings.

The principal object of my invention is to devise a ring boring machine which is constructed and arranged to effectively grip a limited annular portion of the side of a ring against a suitable anvil and to counterbore the same within said portion to any predetermined depth.

A further object is to devise a machine of the character described which is entirely automatic in operation, functioning to effectively grip and counterbore a piston ring which has been previously placed in position, and thereafter to automatically retract and release the boring head and gripping member, respectively.

A further object is to devise a ring boring machine as above set forth which is constructed and arranged to automatically disengage the driving mechanism from the driven members, including the boring head and gripping member, in the event that any loose object prevents the free movement of these parts, or the ring holder is not in precise registering position, or for any reason that would interfere with the normal movement of the parts in question, thus avoiding strains on the machine and possible breakage.

A further object is the provision of a boring machine which is arranged to counterbore a piston ring to varying, predetermined depths, without requiring the substitution of any major parts and in which rings of different sizes may be easily handled after making simple adjustments and replacements to fit the particular size to be bored.

A further object is to provide a mechanism of the class described which functions with a high degree of precision on a production basis, with a minimum of care on the part of the operator, and which incorporates a variety of features which are designed to secure an absolutely true, concentric counterboring of one side of a piston ring.

My improved machine is more particularly designed to perform the counterboring operation on each member of a piston ring structure comprising two parts which are assembled on a piston with the counterbored portions in facing relation and the annular lips formed thereby extending toward each other, the indicated portions being separated by an annular land on the piston. Prior to being operated upon by my machine, the ring has been finish-turned and slitted, and is generally rectangular in cross section with a slight bevel extending inwardly from one side thereof for a predetermined distance.

In order to fulfill the primary purpose of a ring structure of the foregoing character, respecting its free movement and proper lubrication both within the ring groove of the piston and also between it and the cylinder wall at all engine speeds and temperatures, while achieving an approved mechanical structure in other fundamentals, respecting the transmission of heat to the cylinder walls to avoid any cracking tendency of the lubricant, and a correct design for adequately resisting the stresses and strains of operation, it is important that the counterboring be performed with precision. However, the difficulty of this operation is greatly increased by reason of the comparative thinness of the annular lip formed by the counterbore, this lip having the thickness of about $\tfrac{3}{32}$ inch for a ring diameter of 3¼ inches, so that it is the special object of the present invention to provide a machine that will positively and adequately hold a piston ring over the limited area indicated during the boring operation.

The machine is further designed to receive and present rings to the boring tool with speed and accuracy, and is therefore especially adapted for operation on a large scale production basis.

These and further objects of my invention will be set forth in the following specification, reference being had to the accompanying drawings, and the novel means by which said objects are effectuated will be definitely pointed out in the claims.

In the drawings:

Figure 1 is a side elevation of my improved boring machine.

Fig. 2 is a front elevation of the machine, looking in the direction of the arrow 2 in Fig. 1.

Fig. 3 is an enlarged section along the line 3—3 in Fig. 2, looking in the direction of the arrows, and showing the manner of securing a feeding drive to the shaft which operates the boring bar.

Fig. 4 is a perspective view of a finished ring element after being counterbored by the machine.

Fig. 5 is an enlarged section along the line 5—5 in Fig. 2, looking in the direction of the arrows, and showing the portion of the mechanism for operating the gripping member of the machine, the mechanism for actuating the boring tool, and the tripping mechanism which interrupts the power flow to both of the aforesaid mechanisms under certain circumstances.

Fig. 6 is an enlarged plan view along the line 6—6 in Fig. 2, looking in the direction of the arrows, and showing the cam assembly which controls the automatic movements of the machine.

Fig. 7 is a section along the line 7—7 in Fig. 5, looking in the direction of the arrows, and showing the fluid actuated motor which operates the gripping member in addition to certain other features described more fully hereinafter.

Fig. 8 is a detail view looking in the direction of the arrow 8 in Fig. 7 and showing the cam and follower which controls the admission of fluid to the motor which operates the gripping member.

Fig. 9 is a section along the line 9—9 in Fig. 5, looking in the direction of the arrows, and showing the relation of the gripping member and boring tool.

Fig. 10 is an enlarged plan view along the line 10—10 in Fig. 2, looking in the direction of the arrows, and showing the relation of the ring holder to the adjacent portions of the machine.

Fig. 11 is a section along the line 11—11 in Fig. 10, looking in the direction of the arrows, and showing the mechanism for maintaining the ring holder in registering position and also a part of the means for adjusting the housing which guides the gripping member and boring tool.

Fig. 12 is an enlarged sectional view of the lower portion of the machine, as viewed in Fig. 9, and showing the gripping member and boring tool in operative relation to a piston ring.

Fig. 13 is an enlarged, sectional view of a portion of the ring element shown in Fig. 4 and showing in dotted lines the counterbored portion of the ring which is removed by my improved machine.

Fig. 14 is a section along the line 14—14 in Fig. 5, looking in the direction of the arrows, and showing the plan view of the adjusting nut utilized as a stop to limit the downward movement of the boring bar.

The numeral 20 designates the table of my improved machine which is supported by any appropriate number of legs 21. The frame 22 extends upwardly from said table and a bracket 23 carrying a motor 24 is secured adjacent the upper end of said frame. The shaft of said motor is connected by any suitable coupling, such as 25, to a worm 26 which is rotatably mounted in a housing 27 which is formed at the upper portion of said frame. The worm 26 meshes with a worm gear 28 which is freely and revolubly mounted on a sleeve 29 that extends downwardly through the bottom of the housing 27 for threaded engagement with a nut 30. The upper end of the sleeve 29 is flanged as at 31 for engagement with a similar portion on the gear 28, as a means of limiting the upward movement of said gear, the downward movement thereof being limited by a ring 32 interposed between the underside of said gear and the bottom of said housing. A flanged collar 33 is bolted to the upper side of the worm gear 28 and is provided on the upper end thereof with a plurality of annular teeth 34 which mesh and have sliding engagement with similar teeth 35 provided on a collar 36 which is secured to the upper end of a shaft 37. Said shaft has bearing engagement with the sleeve 29 and extends downwardly below the housing 27 for driving engagement with the boring bar hereinafter described. The nature of the toothed engagement between the collars 33 and 36 is such that said last-named collar may have an endwise movement relative to the collar 33, while still maintaining the driving relation therebetween, this construction being adapted for a purpose hereinafter explained.

A reduced, cylindrical extension 39 of a pulley 40 is secured to the gear 28 through the flange 38 of the collar 33 by the same bolts which secures said collar to said gear. Accordingly, it will be apparent that the rotation of the worm 26 imparts a similar movement to the pulley 40 and also the collar 36 by reason of the construction noted.

A belt 41 rides on the peripheral surface of the pulley 40 and also on the peripheral surface of a pulley 42 which is secured to one end of a spindle 43 that is rotatably mounted in a bracket 44 attached to the upper end of the frame 22. The spindle 43 extends below the bearing portion of said bracket and at its lower end is connected to one element of a universal joint 45, the other element of which is secured to the upper end of a shaft 46. The lower end of said shaft is connected to one element of a universal joint 47 and the other element of said joint is connected to a worm 48 which is rotatably mounted in a lever 49. The lever 49 is pivotally secured at one end, as at 50, to one wing of the frame 22, which is substantially U-shaped in cross section as shown clearly in Fig. 6, and the other end of said lever extends across said frame and beyond the other wing thereof for attachment to one end of a reach rod 51. The other end of said rod is positioned for easy access thereof by the operator and may be provided with a hand grip 52 for that purpose.

In the position shown in Fig. 6, the worm 48 meshes with a worm gear 52 which is mounted on a cam shaft 53 that is rotatable within a pair of bearings 54—54 provided on the wing ends of the frame 22. The cam shaft 53 and the cams mounted thereon control the automatic movement of the machine and from the details of construction that have hereinbefore been described, it will be understood that the drive to said shaft from the motor 24 is accomplished through the medium of the following elements: The worm 26, worm gear 28, pulley 40, belt 41, pulley 42, shaft 46, worm 48 and worm gear 52.

A plate cam 55 is secured to one end of the shaft 53 and is provided with cam surfaces 55ª and 55ᵇ which are located, respectively, at different radial distances from the center of the cam, the former surface being positioned closer to said center. A cam follower 56 in the form of a roller is located below the cam 55 for actuation by said surfaces and is rotatably mounted in one end of an arm 57 whose other end is pivotally secured as at 58 to the frame 22. One end of a rod 59 is attached in any approved manner to the arm 57 and extends downwardly therefrom through the seat of the frame 22 and the table 20 for actuating engagement with a valve 60 of approved construction which is supported by a suitable hanger 61 extending from the under side of the table 20. The valve 60 is located in an air line 62, which may also include a hand valve 63 of ordinary construction for a purpose hereinafter explained, and the internal construction of the valve 60, which forms no part of the present invention, is so arranged that a downward movement of the rod 59 opens the valve for the passage of air and a movement of said rod in the opposite direction closes said valve. A spring 64 encircles the rod 59 between the seat of the frame 22 and a collar 65 secured on said rod for the purpose of maintaining the follower 56 in rolling contact with the peripheral surface of the cam 55.

On the delivery side of the valve 60, a constantly open bleed hole 66 may be provided, as in an elbow 67, for a purpose hereinafter explained and said elbow may be connected by any suitable nipple to the lower end of a stem 68 having an axial hole 69 extending from end to end thereof. The stem 68 is mounted in an aperture in a boss 70 which depends from the underside of the table 20 and is maintained in the position shown in Fig. 7 by a threaded engagement with a nut 68ª which draws said stem downwardly so that the underside of the enlarged, intermediate portion 71 contacts with the top surface of the table 20. A piston 72 is slipped over the upper end of the stem 68 and rests on the upper surface of the portion 71, being maintained in this position by a nut 73 which has threaded engagement with the upper end of said stem and also serves to compress packing 74 against the upper surface of the piston 72. From the foregoing, it will be apparent that the piston 72 is positively fixed against any movement. A movable cylinder 75 encloses the piston 72 and at two opposite points in the skirt of said piston is provided with a pair of threaded holes 76, each of which receives one end of a stud 77, the other end of said stud extending downwardly through and below the table 20. A spring 78 encircles each stud between the under side of the table 20 and a washer 79 mounted on said stud and secured in the indicated position by a nut 80. Accordingly, when air is admitted to the interior of the cylinder 75, as hereinafter described, the upward movement of said cylinder will compress the springs 78 which functions to return said cylinder to the position shown in Fig. 7 when the air supply is cut off.

A U-shaped bracket 81 is bolted to the upper side of the cylinder 75 and a rod 82 is located in holes provided in the upper wing ends of said bracket and extending beyond said ends for pivot engagement with a pair of levers 83. Said levers are provided with elongated slots 84 at one end thereof (see Fig. 5) for receiving the ends of the rod 82 and are fulcrumed on pins 85, each of which is carried by a pair of links 86, so that each of said levers is mounted for pivotal movement between each pair of the links 86. The lower ends of the links 86 are pivotally mounted on brackets 87, located on the table 20, through the medium of pins 88. The other ends of the levers 83 or the ends opposite to the elongated slots 84, have pivotal engagement with a pair of cylindrical extensions 89 which are provided on a split ring 90 which is seated in a channel 91 formed on a sleeve 92. The split ring 90 is gripped against the sleeve 92 by a pair of cap screws 93.

The lower end of the sleeve 92 is threaded externally (see Fig. 9) to receive a nut 94 which is provided with an inwardly extending, annular flange 94ª which clamps therebetween and the adjacent end of the sleeve 92 an external, circular flange 94ᵇ formed on a gripping ring 94ᶜ. This mounting arrangement of the ring facilitates replacement thereof when desired and also makes for accuracy, owing to absence of distorting tendencies under load. The ring 94ᶜ is also provided with a depending, annular lug 95 which functions as the gripping member for the piston ring in the manner hereinafter explained. The ring 94ᶜ is provided with an axial opening 94ᵈ of sufficient diameter to permit of the free passage of the boring tool hereinafter described and the upper surface of said ring may be beveled as at 96 (see Figs. 9 and 12) for defining an annular space 96ª with a similar surface formed on the lower end of a cylindrical extension 97 which depends from the under side of a plate 98 that is secured to the top of a housing 100 by cap screws 99. The space 96ª registers with a plurality of air supply ports 96ᵇ provided in the sleeve 92, whereby when an appropriate vacuum is established below the piston ring support during the boring operation, dust and chips will be evacuated as formed and the cutting tools will be cooled. The cylindrical extension 97 operates as a vertical guide for the gripping member in its movement to and from the piston ring and also performs a similar function for the boring head as hereinafter described. A hollow extension 101 projects upwardly from the upper side of the plate 98, being aligned with the extension 97, and is threaded externally to receive a split, adjustable nut 102 which serves as a stop to limit the downward movement of the boring head as hereinafter described. The nut 102 is secured in any adjusted position by means of a cap screw 103 and said nut may be further provided with a hand grip 104 to assist in its adjustment.

The housing 100 partly encircles the sleeve 92, leaving the same open for access from the front as shown clearly in Fig. 2, and is flanged around its lower side as at 105. The housing 100 is mounted on the table 20 by means of a three point, adjustable support as a means of providing for an accurate application of a gripping member and boring head, which are guided by said housing, to the piston ring which is to be bored. The points of support are arranged with one point in rear of the housing 100 and two points abreast of each other adjacent the front portion of said housing, as shown clearly in Figs. 1 and 6. The rear point of support is provided by a washer 106 which is interposed between the underside of the flange 105 and the upper surface of the table 20 and is secured in position by a bolt 107 which passes through said washer, flange and said table. Adjustment at each of the two forward points of support is provided by a screw 108 having an enlarged head 109 which rests on the top surface of the table 20 in a depression 110 provided for its reception. This screw is threaded in a hole 111 formed in the flange 105, so that vertical and consequently tilting movements of the housing 100 may be effected by applying a suitable tool to the head 109, the recesses 110 providing the necessary clearance for that purpose. The adjustment so secured is maintained by a bolt 112 which passes upwardly from the underside of the table 20 through the screw 108 and receives on its upper end a nut 113 which draws the bolt 112 against the washer 114 interposed between said nut and the adjacent, upper surface of the flange 105.

The foregoing description completes the detailed arrangement of the gripping member, the mechanisms for operating the same, and the means for adjusting said member for correct application to the piston ring. The boring head and the mechanism for operating the same will now be described.

A plate cam 115 (see Fig. 5) is secured to the cam shaft 53 and is provided with plane cam surfaces 116 and 117 which are angularly disposed relative to each other and connected at their junction by a curved surface 118. Such cam is further provided with a curved cam surface 119 whose radial distance increases gradually from its junction at the point 120 with the surface 116 to its junction at the point 121 with the surface 117, for a purpose hereinafter explained. A cam follower 122 in the shape of a roller rides on the aforesaid cam surfaces and is pivotally mounted in one end of a lever 123 which is provided adjacent said follower with an extension arm 124, from which is supported a counterbalance weight 125 that serves the dual purpose of maintaining operative engagement with the follower 122 with the cam 115 and also to retract the boring head from the piston ring upon the completion of the boring operation in the manner hereinafter explained. The lever 123 is yoked at its opposite end to form a pair of arms 126 which are pivotally mounted on a pin 127 secured in the frame 22 as shown in Figs. 5 and 6. Intermediate of the ends of the lever 123, an adjusting screw 128 is threaded through said lever and extends downwardly for contact with one end of a lever 129. The lower end of a pin 130 is fixed in the lever 129 adjacent the point of contact of the screw 128 therewith and said pin extends upwardly and freely through the lever 123 and has mounted on the upper end thereof a spring 131 for compression between the upper side of the lever 123 and a washer 132 which is positioned on said pin by a nut 133. The purpose of the adjusting screw 128 and the spring 131 will be explained more fully hereinafter.

The lever 129 is likewise fulcrumed on the pin 127 between the arms 126 and extends toward the top of the machine to provide a yoke comprising the arms 134, as shown in Fig. 6. The end of each arm 134 is slotted as at 134ª to receive a sliding block 135 which is pivotally mounted on cylindrical, pin extensions 136 formed on a ring 137. The ring 137 is slipped over a bushing 138 and is seated against the head 139 thereof, as shown in Fig. 9. Said head in turn rests on a disk 140 which is supported in a manner presently to be described and which functions both as an engager for the adjusting nut 102 to limit downward movements of the boring bar and also as a flywheel for the latter. The upper end of the bushing 138 is threaded to receive a nut 141 which clamps the ring 137 against endwise movement and within said bushing is slidably mounted the upper portion of a boring bar 142. The upper extremity of said bar is threaded to receive a nut 143 which is externally splined as at 144 and which, together with the adjacent end of said bar, is located in abutting relation to the enlarged lower end of the shaft 37 which is splined as at 145. An internally splined sleeve 146 is slipped over the portion 145 and the nut 143 for meshing engagement with said element and endwise displacement of said sleeve is prevented by means of set screws 147. From the foregoing, it will be apparent that a motion of rotation which is imparted to the shaft by the pulley 40 will be transmitted directly through the splined connection indicated to the boring bar 142.

The boring bar 142 extends downwardly through the disc 140, the latter being keyed or otherwise secured thereto in any approved manner, and on the underside of said disc said bar is provided with a shoulder 148 against which said disc is seated by the nut 141. The under surface of the disc 140 is provided with an annular track 140ª which fits into curved channel ways 140ᵇ formed on the upper ends of a plurality of plungers 140ᶜ which are slidably mounted through the nut 102 and normally pressed upwardly by springs 140ᵈ abutting against centering posts 140ᵉ provided on the plate 98. The boring bar 142 in its downward movement is actuated against the compression of the springs 140ᵈ so that the latter tends to prevent by absorption any chattering tendency of the working end of the bar. These springs, of which there may be three as shown in Fig. 14, act in conjunction with the weight 125 in retracting the boring head from working position. The boring bar further extends downwardly within the cylindrical extension 97 and is provided on the lower end thereof with an enlarged portion 149 serving as a boring head. Said head is axially aligned with and positioned within the opening 94ᵈ of the ring 94ᶜ and is bored inwardly from the end thereof with a comparatively sharp taper which is provided with a plurality of downwardly and outwardly extending channels 150, preferably four in number to receive the cutting tools 151. The lower ends of said tools are appropriately shaped and sharpened to effect the boring operation and approach closely to, but definitely separated therefrom, the inner wall of the ring 94ᶜ. The tools 151 are prevented from dropping downwardly from the channels 150 by the tapered head 152 of a set screw 153 which is threaded in an appropriate hole 154 provided within the bar 142. Set screws 152ª mounted in the head 152 (see Fig. 12) provide a further means of effecting an endwise adjustment and fixation of the tools 151.

Above the tools 151, the boring head 149 is reduced in diameter to form a shoulder 155 on which rests a dust ring 156 which coacts with the adjacent, inner wall of the guide extension 97 for the purpose of forbidding access of dust, chips and other foreign material to the bearing hereinafter described. A further reduction in diameter of the boring bar 142 is provided above the dust ring 156 to form a shoulder 157 on which is seated an anti-friction bearing, such as balls, rollers, and the like, said bearing being denoted by the numeral 158. The bearing 158 has operative engagement with the adjacent, cylindrical exterior of the bar 142, and also with the adjacent, cylindrical interior of a sleeve 159 which is slidably and guidably mounted within the guide extension 97. A shoulder 160 is formed in the sleeve 159 for contact with the upper, circular edge of the bearing 158 which is opposite to the lower, circular edge of said bearing which rides against the shoulder 157. A second, anti-friction bearing 161 is mounted on the portion of the bar 142 just below the disc 140 and said bearing has engagement, not only with said bar, but also with the adjacent, cylindrical interior of the sleeve 159 in the same manner as does the bearing 158. Endwise movement of the bearing 161 downwardly is prevented by a shoulder 162 provided in the sleeve 159 and upward movement by a nut 163 which engages the threaded portion 164 of the bar 142, immediately below the disc 140. Any suitable pressure may be applied to the bearings 161 and 158 by the nut 163 and the nature of the construction is such that, whatever adjustment is effected, the boring bar 142 and the sleeve 159 move in endwise direction as a unit, but the provision of the bearings 158 and 161 permits a rotative movement of the bar 142 independent of said sleeve. It will be further understood from the foregoing description that an actuation of the lever 129 results in vertical movements in both directions of the shaft 39, boring bar 142, disc 140, and sleeve 159, while still permitting the rotative movement of said bar as aforesaid. The adjustment secured by the nut 163 may be maintained by a lock nut 165 which is also threaded on the bearing bar 142 and a dust ring 166 may be carried by the nut 163 to prevent the filtering of dust and other foreign matter downwardly to the anti-friction bearings.

Under certain conditions of operation of the machine, it is desirable to automatically interrupt the transmission of power to the gripping member and boring head and the tripping mechanism for effecting this disengagement will now be described.

A plate cam 167 (see Fig. 5) is secured to the cam shaft 53 and is provided with concentric cam surfaces 168 and 169 which are located at lesser and greater radial distances from the center of the cam, respectively. A cam follower 170 in the form of a roller rides against said cam surfaces and is rotatably secured in one end of a rocker arm 171, the other end of which is pivotally secured to the frame 22 as at 172. In order to maintain the follower 170 in contact with the cam surfaces, a rod 173 is fixed at one end to the frame 22 and passes freely through the arm 171 to receive a spring 174 which is compressed between said arm and a washer 175 located on said rod and secured in position by a nut 176. Between the follower 170 and the attaching point 172 of the arm 171, one end of a link 177 is pivotally secured as at 178 and the other end of said link is pivotally secured as at 179 to an arm 180 which is carried on the rod 82, as shown clearly in Figs. 5 and 7. Said link extends beyond the arm 180 and is squared on the end thereof for engagement under certain conditions with the bent portion 182 of an arm 183 formed on an L-shaped lever 184 which is pivotally secured at the junction of its arms to the frame 22, as at 185. The other arm 183ª of said lever extends rearwardly from the pivot 185 and is provided on the end thereof with a notch 186 which normally engages with two sides of the lever 49, as shown in Fig. 5. The arm 183ª is pivotally secured to one end of a link 187 which extends downwardly through and below the table 20 for pivotal engagement at the opposite end thereof with a foot pedal 188 which may be pivotally secured at one end as at 189 to one of the legs 21, as shown in Fig. 1. The position of the lever 184 shown in Fig. 5, this being its locking position with reference to the lever 49, is maintained by a spring 190 which encircles the link 187 between the upper surface of the table 20 and a washer 191 secured to said link.

A special type of construction is provided to initially receive the rings and to place them individually in accurate registration with the gripping member and boring head before described and the arrangement for effecting this result will now be described.

A rotary ring holder 192 (see Fig. 11) is mounted in spaced relation to the top surface of the table 20 by a block 193 which is secured in any approved manner to said table. The holder proper is further spaced vertically from the block 193 by a depending, cylindrical extension 194 formed integral with said holder which is secured to the table 20 and mounted rotatably in respect thereto by means of a threaded pin 195 which passes downwardly through said holder, the block 193, and an apertured boss 196 which depends from the underside of said table. A set screw 197 is mounted in said boss, extending upwardly from the lower side thereof, and the threaded shank thereof engages with the similarly formed hole 198 provided in the lower end of the pin 195. A disc 199 is secured on the underside of the holder 192 and is provided with a plurality of slots 200, preferably four in number, said slots being so disposed that the plane which includes the center of each of said slots also includes the axis of one of the ring receiving holes 201 provided in each of a plurality of ring receivers 201ª which are demountably positioned in said holder, the stepped construction facilitating their removal and insertion. The diameter of the holes 201 is such that, when a piston ring is placed within said hole, it will be sufficiently compressed to substantially close the slit thereof, so that not only is sufficient frictional contact exerted on the outer peripheral surface of the ring to retain the same within the holder prior to reaching boring position, but it also renders possible the securement of a true boring operation. Preferably, there are four ring-receiving holes 201 equi-spaced around the holder 192 and the support of said holder with reference to the table 20 is arranged so that a portion of said holder extends forwardly of the machine and beyond the front edge of the table 20, as shown in Fig. 5. The purpose of this construction is to permit a hand feeding of each ring within the holder 192 from the underside thereof, the fingers of the operator serving to substantially align the underside of the ring with the underside of said holder.

A housing 202 is located to one side of the block 193 on the table 20 and within said housing is pivotally mounted a lever 203 on a pin 204. Said lever is generally L-shaped in form and one arm thereof extends upwardly and is curved at the end thereof to provide a nose 205 which engages with the walls of a slot 206 provided in a detent block 207 slidably carried by the housing 202 and normally maintained in extended, or locking, position with the disc 199 by means of a spring 208 which is compressed between one end of the block 207 and the adjacent side of the housing 202. The other arm of the lever 203 is pivotally secured to one end of a link 209 which extends downwardly through the table 20 and is secured at its lower end to a pedal 209 which is pivotally or hingedly secured at one end, as at 210, to the floor or an appropriate substructure of the machine.

The operation of my improved machine will now be described.

During normal operation of the machine, the motor 24 and hence the cam shaft 53 are operating continuously, the operator having sufficient time during the boring operation to place a piston ring in one of the holes 201 and during the retracting movement of the gripping member and boring head to re-position the ring holder to place a new ring in registering position. Therefore, in order to describe the operation of the machine, it will be considered that a new ring, represented generically by the numeral 212 in Fig. 9, has been placed in position for the boring operation. At this period of the cycle of operation of the machine, the timing relation of the several cams, 55, 115, and 167, which control the automatic movements of the machine, is shown generally in Figs. 5 and 7, although it will be understood that no attempt has been made to illustrate precisely such relation. In the positions indicated, the cam 55 is almost on the point of actuating the roller 56 downwardly to thereby admit fluid pressure to the cylinder 75, the follower 122 is riding slowly up the plane cam surface 116 to thereby cause a slow movement of the boring head toward the ring 212, and the follower 170 is merely riding on the cam surface 168. The motions of rotation of the several cams are as indicated by the arrows in Figs. 5 and 7.

When the follower 56 rides up the incline 213 of the cam 55 to thereby contact with the cam surface 55ᵇ, the valve 60 is immediately opened to admit fluid pressure to the interior of the cylinder 75 which thereupon moves upwardly to cause a corresponding movement to the ends of the levers 83 to which said cylinder is connected. The opposite ends of said levers thereupon move downwardly to cause a corresponding movement of the sleeve 92 and the ring 94ᶜ, or generally the gripping member, which is carried thereby, thereupon assumes the position shown in Fig. 12. This position is such as to grip the ring within the holder 192 against an anvil 214, which is in the form of an annular ring, and is secured to the upper surface of the table 20 by means of set screws 215 which extend upwardly from the underside of said table. The thickness of the holder 192 adjacent the periphery of the ring 212 is less than the thickness of said ring, so that the gripping member is free to perform its primary function with reference to said ring without binding on other parts.

By the time the gripping member is fully seated on the upper side of the ring, the follower 122 will have moved along the cam surface 116 until it reaches the point 120, at which time the boring head 149 will have been lowered by the levers 123 and 129 until the tools 151 are substantially in contact with the upper side of said ring. During this time, it will be understood that a rotative movement has not only been transmitted to the cam shaft 53 by means of the several elements hereinbefore described, but that a similar movement has been transmitted to the boring bar 142 by means of the worm gear 28, meshing collars 33, and 35, and the shaft 37, which is connected at its lower end for driving, rotative movement with the upper end of the boring bar. Accordingly, as the boring head 149 is moved downwardly toward the ring 212, the boring tools 151 will be rotated in order to effect the desired counterboring. Said tools having been placed in contact with the upper side of the ring 212, the follower 122 continues to ride along the cam surface 119 and is gradually raised upward due to the increasing radial curvature of said surface. This gradual raising of the follower and of the lever 123 imparts the feeding movement to the boring tools 151 until the follower 122 reaches the point 121 on the surface of the cam, whereupon further feeding movement ceases and the follower 122 rides down the plane cam surface 117 to retract the boring head 149 to the position shown in Fig. 9, which retracted movement is effected through the medium of counterbalance weight 125, and the springs 140ᵈ.

After the boring tools 151 have been retracted from the counterbored ring, the follower 56 will have reached the inclined surface 216 on the cam 55, after which the follower 56 rides on the cam surface 55ᵃ, under the extension of the spring 64, to thereby close the valve 60 and cut off the supply of fluid pressure to the interior of the cylinder 75. The pressure then in said cylinder is thereupon exhausted through the bleed hole 66, whereupon the springs 78 become active to retract the cylinder 75 to the position shown in Fig 7, which movement through the levers 83 serves to release the gripping member from contact with the counterbored ring.

The counterboring operation having been completed, the operator steps on the pedal 210 for the purpose of retracting the detent block 207 from the disc 199 and rotates the holder 192 by hand until the next ring is brought into registering position, which position is indicated by the engagement of said block with one of the slots 200 provided on said holder. In the normal operation of the machine, there will always be a ring already positioned in the next ring receiving hole 201 for presentation to the gripping member and boring head, as above described, since each time that a ring is being bored, the hole 201 at the opposite side of the holder will lie in a position to the front of the machine and beyond the table 20, at which time the operator removes the counterbored ring from said hole and replaces the same with a ring to be bored.

The purpose of the slit nut 102 is to control and limit the downward movement of the boring head, thereby limiting the depth of cut made by the boring tools 151. An adjustment of said nut for any given depth having been effected, the boring bar 142 in its movement downward eventually brings the disc 140 into stopping contact with the top surface of the nut 102. If the downward extent of movement of the bar 142 is normally greater under the throw of the cam 117 than that permitted by the nut 102, the excess movement is absorbed through the compression of the spring 131, the lever 123 merely lifting with reference to the lever 129 which is prevented from further movement of the interaction of the disc 140 and the nut 102. Accordingly, the yielding connection between the levers 123 and 129 permits the attaining of a variety of depths of counterbore which are less than that which would be normally effected by the rotation of the cam 115 and the machine is therefore highly versatile in its operation. A further adjustment on the movement of the boring head 149 may be secured by suitably positioning the adjusting screw 128 which thereby determines the initial position or the uppermost position of the boring head 149. During the feeding movement of the boring tools 151, it will be understood that the same is readily permitted by the upper end of the shaft 37 which has an endwise sliding and driving connection with the worm gear 28, so that the boring bar 142 may not only rotate freely, but also slide vertically without interrupting with the necessary driving relation of the indicated parts.

In the operation of the machine as above described the arrangement of the tripping mechanism with reference to the cam 167 and the other cams on the shaft 53 is such that when the follower 170 rides on the cam surface 169, which movement throws the link 177 toward the right, as viewed in Fig. 5, or toward the front of the machine, such movement of said link will not cause an actuation of the portion 182 of the lever 184, since at that time, the cylinder 75 will have moved upwardly sufficient to permit the end 181 of said link to pass freely over the portion 182. Accordingly, the tripping mechanism operates idly during the normal operation of the machine. However, if for some reason, the ring holder 192 has not been placed in proper registering position, or some object such as a tool has been carelessly left on the upper surface of said holder, and in a position to interfere with the normal, downward movement of the gripping member, it is important to provide some means for interrupting the application of power to the gripping member and boring head in order to prevent breakage, or severe strain upon the machine. Assuming that some object has interfered with full, downward movement of the gripping member, so that the said member is held in some position above its normal contact with the upper side of the ring, it will be apparent that the cylinder 75 will thereby be prevented from making its normal stroke. Hence, when, in the rotation of the cam shaft 53, the follower 170 rides on the cam surface 169 to thereby throw the link 177 toward the right, as shown in Fig. 5, the insufficient movement of the cylinder 75 will cause an actuation of the lever 184 by the link 177 to thereby rotate said lever in a clockwise direction, as viewed in Fig. 5, and removing the same from engagement with the levers 49. The reaction between the rotating worm 48 and the worm gear 52, which is fixed in lateral direction, results in a throwing of said worm away from said gear by reason of the former's location on the lever 49 which is pivoted on the frame 22. This lateral movement of the worm 48 is, of course, permitted by its universal connection with the pulley 42, as shown in Fig. 1. The flow of power to the cam shaft 53 having thus been interrupted, the boring head comes to rest, after which the hand valve 63 may be closed to shut off the supply of air to the cylinder 75, the air then in said cylinder being exhausted through the bleed hole 66. The gripping head may then be retracted sufficiently to remove the obstruction, whereupon the reach rod 51 may be actuated to replace the worm 48 into meshing engagement with the gear 52.

From the foregoing it will be apparent that the machine is entirely automatic in operation, the only manual labor required being that entailed in the placing of the rings in the holder and their removal therefrom. The adjusting features of the machine provide for a highly accurate counterboring and positive gripping of the ring during that operation, while the tripping mechanism affords a reliable safeguard against breakage. The machine is further extremely versatile in that it may not only handle different diameters of piston rings, but bore the same to a variety of depths without requiring major changes in the mechanism of the machine.

While I have shown one set of elements and combinations thereof for effectuating my improved ring boring machine, it will be understood that the same is intended for purpose of illustration only and in no wise to restrict my device to the exact forms and structures shown, for many changes may be made therein without departing from the spirit of my invention.

I claim:

1. In a piston ring boring machine, the combination of a plate having a recess for receiving a ring, gripping means engageable with a limited portion of the width of said ring inwardly from the outer surface thereof, means for boring the exposed side of said ring within said gripping means, means for actuating said gripping and boring means, and tripping mechanism for interrupting the actuation of said gripping and boring means operative upon a stoppage of said gripping means prior to reaching ring-holding position.

2. In a piston ring boring machine, the combination of a plate having a recess for receiving a ring, gripping means engageable with a limited portion of the width of said ring inwardly from the outer surface thereof, means for boring the exposed side of said ring within said gripping means, a power source, means operated by said source for separately actuating said gripping and boring means, and tripping mechanism for interrupting the power flow to said actuating means operative upon a stoppage of said gripping means prior to reaching ring-holding position.

3. In a piston ring boring machine, the combination of a plate having a recess for receiving a ring, gripping means engageable with a limited portion of the width of said ring inwardly from the outer surface thereof, means for boring the exposed side of said ring within said gripping means, a power source, a cam shaft operatively connected thereto, a pair of cams on said shaft for operating said gripping and boring means, respectively, and means for interrupting the flow of power to said shaft operative upon a stoppage of said gripping means prior to reaching ring-holding position.

4. In a piston ring boring machine, the combination of a plate having a recess for receiving a ring, fluid actuated gripping means engageable with a limited portion of the width of said ring inwardly from the outer surface thereof, means for boring the exposed side of said ring within said gripping means, a power source, a cam shaft operatively connected thereto, a cam on said shaft for controlling the admission of fluid to said gripping means, a second cam on said shaft for operating said boring means, and means for interrupting the flow of power to said shaft operative upon a stoppage of said gripping means prior to reaching ring holding position.

5. In a piston ring boring machine, the combination of a plate having a recess for receiving a ring, gripping means engageable with a limited portion of the width of said ring inwardly from the outer surface thereof, a fluid actuated motor comprising a fixed piston and a movable cylinder operatively connected to said gripping means, a source of fluid supply, means for boring the exposed side of said ring within said gripping means, a power source, a cam shaft operatively connected thereto, a pair of cams on said shaft for controlling, respectively, the admission of fluid to said cylinder and the application of power to said boring means, and tripping mechanism connected to said cylinder for interrupting the power flow to said shaft upon a stoppage of said gripping means prior to reaching ring holding position.

6. In a piston ring boring machine, the combination of means for gripping a ring, means for boring a side of said ring, a power source, a cam shaft, a releasable driving connection between said source and said shaft, tripping mechanism for shifting said connection to a released position, and three cams on said shaft for operating, respectively, said gripping and boring means, and said tripping mechanism, said tripping mechanism being inoperative relative to said connection during the full movement of said gripping means to ring holding position and operatively registering therewith upon a stoppage of said gripping means prior to reaching ring holding position.

7. In a piston ring boring machine, the combination of means for gripping a ring, means for boring a side of said ring, a power source, a cam shaft having gear means, a releasable driving connection comprising a pivoted lever having gear means connected to said cam shaft gear means and power source, a trip lever for maintaining said pivoted lever in a position engaging both of said gear means, cams on said shaft for operating said gripping and boring means, respectively, a third cam on said shaft, and mechanism controlled by said third cam and the movement of said gripping means toward ring holding position, said mechanism having a part for moving said trip lever out of contact with said pivoted lever to permit a movement of the latter to gear releasing position upon a stoppage of said gripping means prior to reaching ring holding position, and said part clearing said trip lever during the full movement of said gripping means to ring holding position.

8. In a boring machine for removing one inside corner from split resilient piston rings to make the latter L-shaped, the combination of a holder encircling and engaging the outer periphery of the ring, a rigid support below the holder, a gripping ring adapted to seat all around against the outer portion of the upper edge of the ring to hold the ring firmly between said support and said ring, boring means including a plurality of cutting tools for simultaneously engaging the ring at different points, and mechanism for operating the boring means to remove the upper inner corner of the piston ring, the holder, gripping ring and boring means being concentrically arranged whereby the resultant counter-bore will be concentric with the exterior face of the ring.

WILLIAM J. CRAMER.